Figure 1:
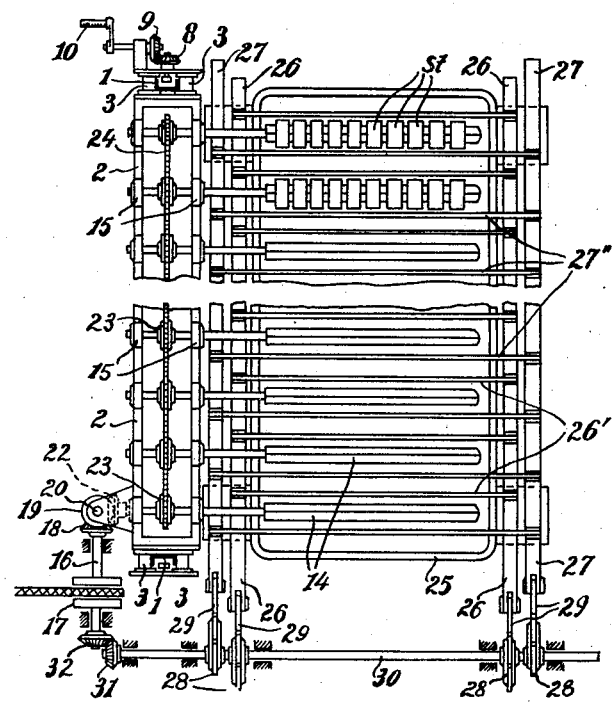

Aug. 17, 1937.   F. FAIGLE ET AL   2,090,385
DEVICE FOR THE TREATMENT OF HANKS OF YARN PARTICULARLY FOR THE DYEING THEREOF
Filed Dec. 23, 1932   9 Sheets-Sheet 1

INVENTORS
Friedrich Faigle
BY Carl Faigle
S. Sokal.

ATTORNEY

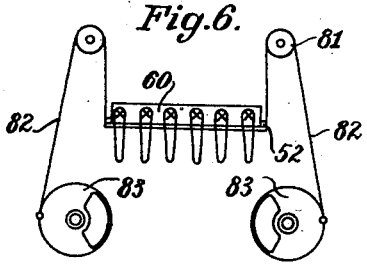
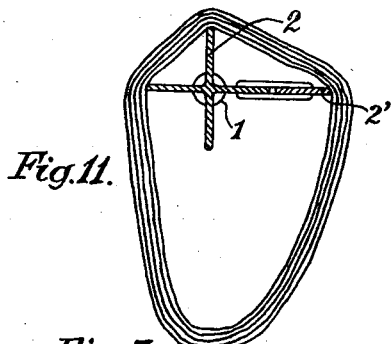
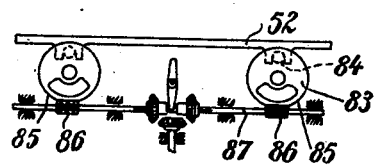
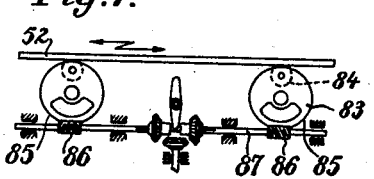
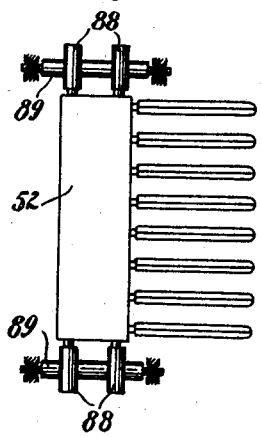
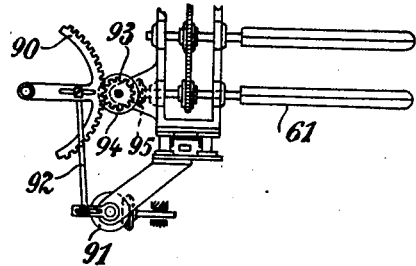
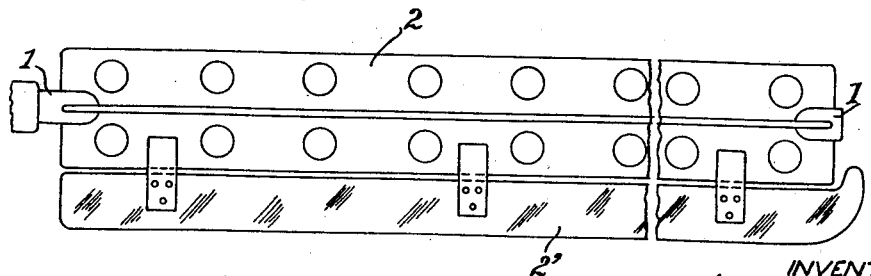

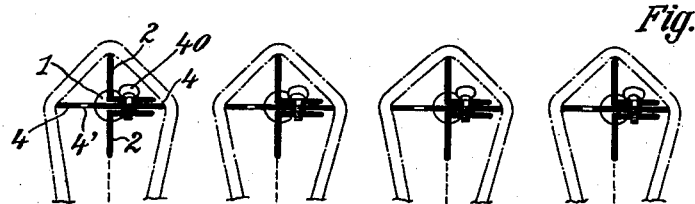
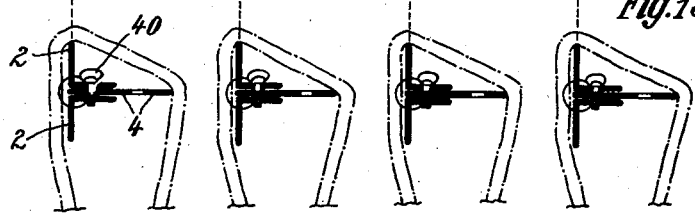
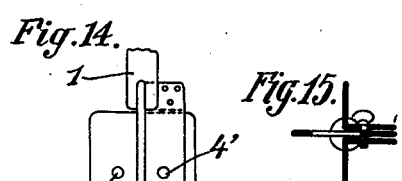  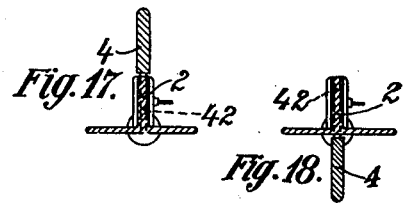 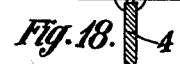
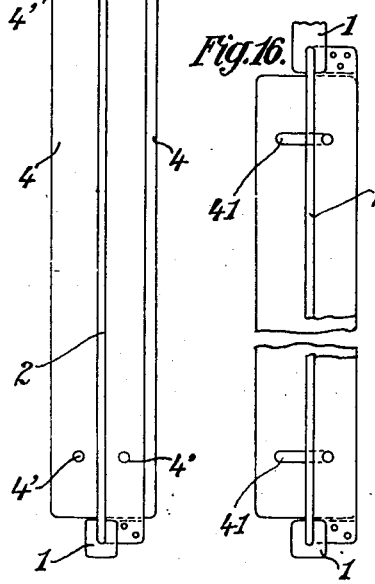
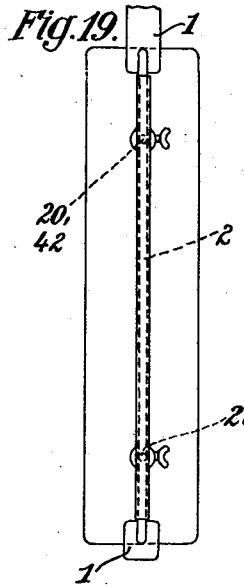

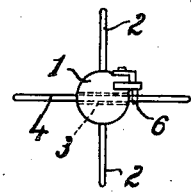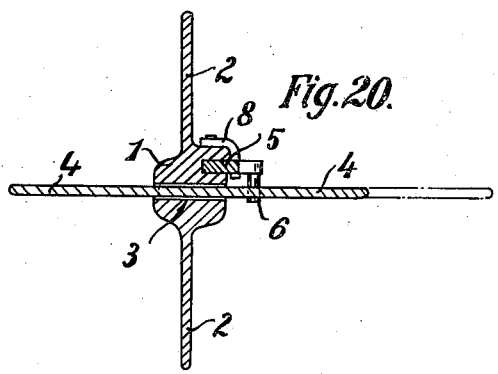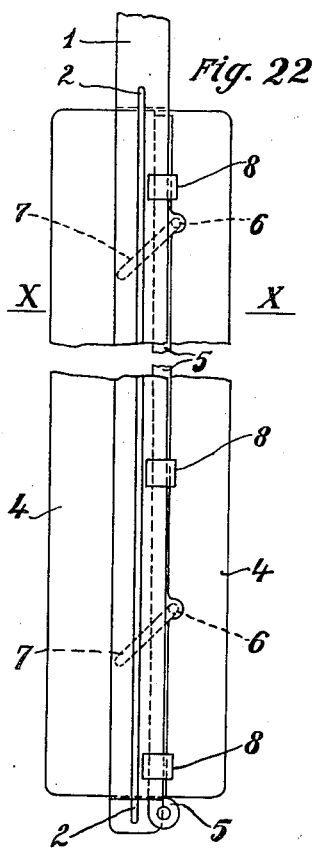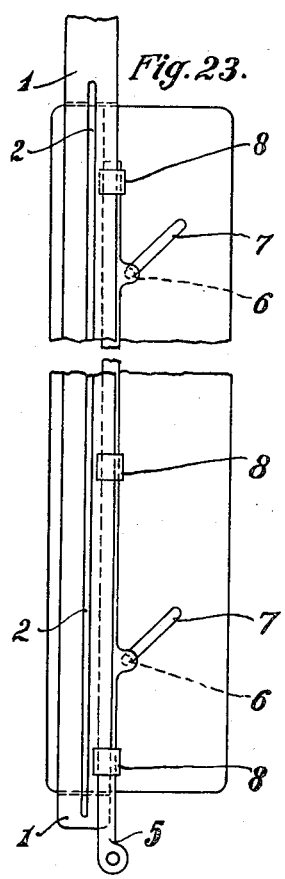

Aug. 17, 1937. F. FAIGLE ET AL 2,090,385
DEVICE FOR THE TREATMENT OF HANKS OF YARN PARTICULARLY FOR THE DYEING THEREOF
Filed Dec. 23, 1932 9 Sheets-Sheet 7
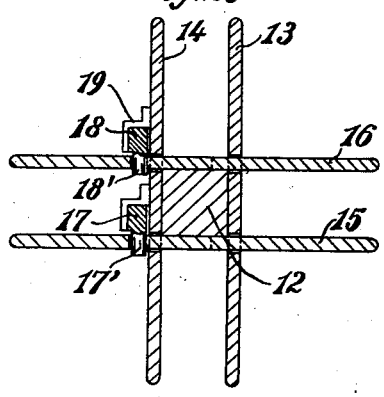
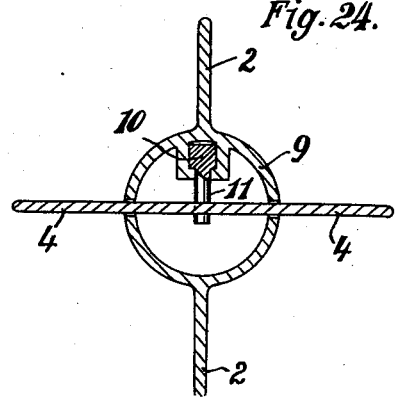
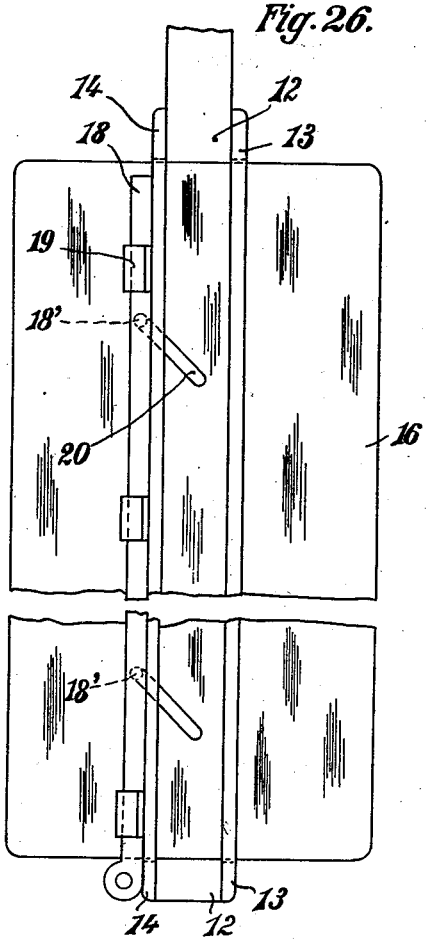
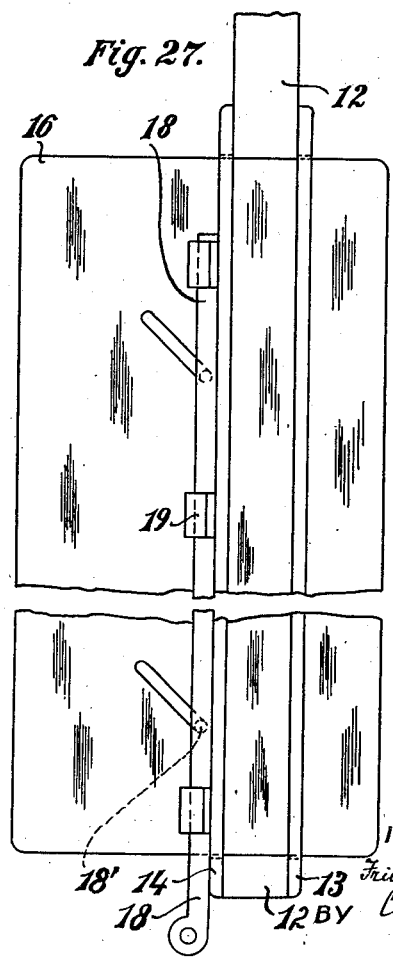
INVENTORS
Friedrich Faigle
Carl Faigle
BY S. Sonal.
ATTORNEY Aug. 17, 1937.   F. FAIGLE ET AL   2,090,385
DEVICE FOR THE TREATMENT OF HANKS OF YARN PARTICULARLY FOR THE DYEING THEREOF
Filed Dec. 23, 1932   9 Sheets-Sheet 9
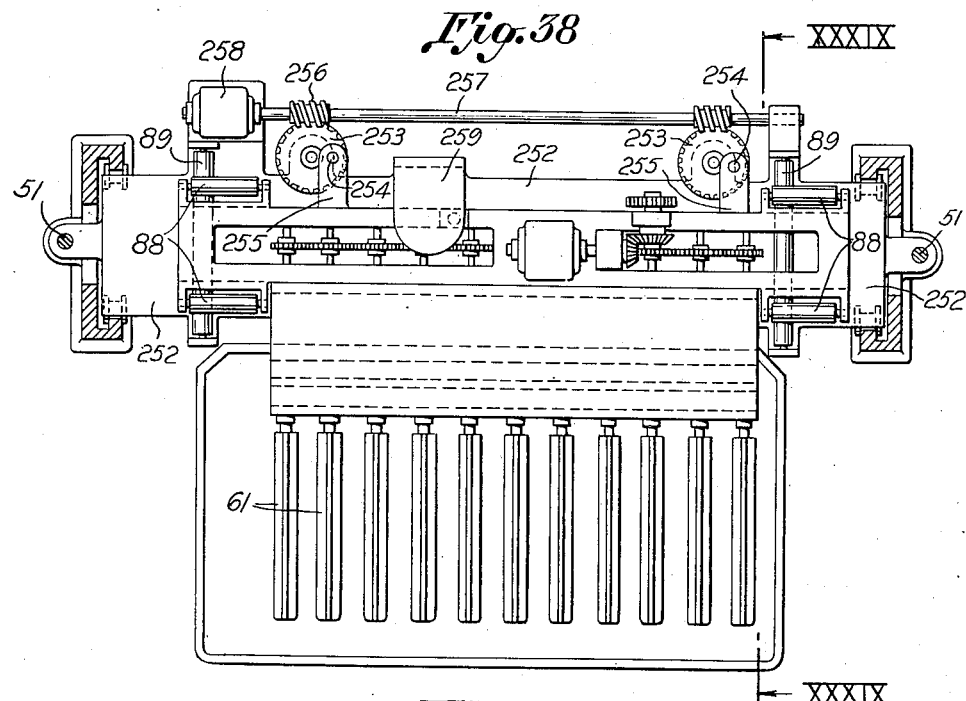
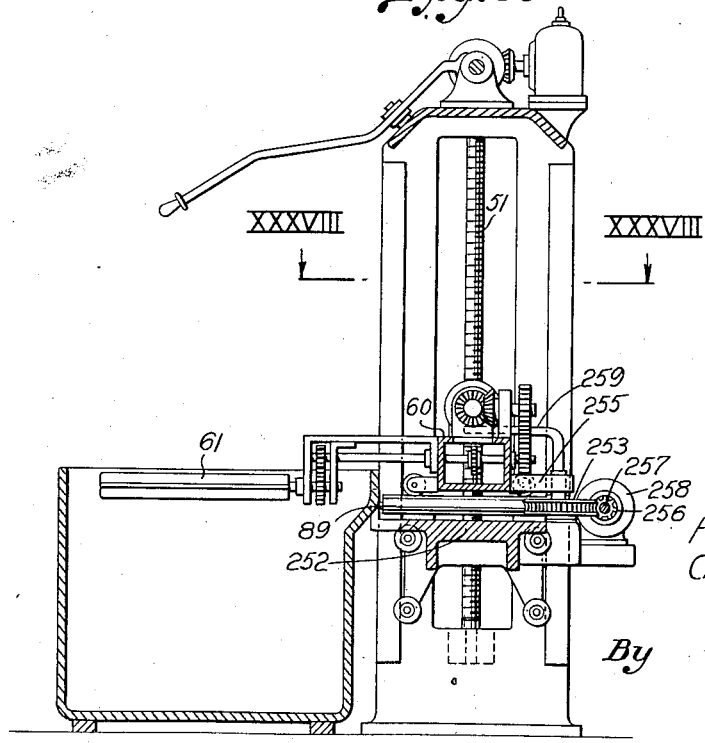
Inventors.
FRIEDRICH FAIGLE
CARL FAIGLE
By
*L. Sokal*
Attorney.

Patented Aug. 17, 1937

2,090,385

UNITED STATES PATENT OFFICE 2,090,385

DEVICE FOR THE TREATMENT OF HANKS OF YARN PARTICULARLY FOR THE DYEING THEREOF

Friedrich Faigle and Carl Faigle, Hard, near Bregenz, Austria

Application December 23, 1932, Serial No. 648,643
In Germany January 2, 1932

2 Claims. (Cl. 8—19)

We have filed applications in Germany on the 2nd January, 1932 and 4th June, 1932; Italy on the 27th June, 1932; Spain on the 1st July, 1932; Argentina on the 5th August, 1932; Brazil on the 27th September, 1932; Austria on the 25th June, 1932, and Australia on the 2nd August, 1932.

The present invention relates to devices for the treatment of hanks of yarn, particularly for the dyeing thereof.

The principal object of the invention is to render it possible to obtain various movements of the hanks of yarn such as are advantageous for the dyeing process or other treatment to which they are subjected. In addition to stepwise multiple dyeing (clouding and production of ombré effects) uni-colour dyeing and also the preparatory and after-treatment and the additional after-treatment, reviving or shading of the hanks are likewise rendered possible by the present invention, which may be applied in connection with dye-stuffs of any kind such as for example, substantive, indanthrene, sulphur and diazo colouring matters.

The invention is particularly characterized by the following features:

1. By the provision of a variety of different devices for the movement of the yarn carrying members which are adapted to be driven uninterruptedly or intermittently in all the positions which the yarn carrying members may occupy and also during the displacement of the said members from one position to another.

2. The particular constructional forms of the yarn carrying members.

Apart from these features the invention is characterized by several further features which will appear from the following description and the claims attached thereto.

Figure 2:
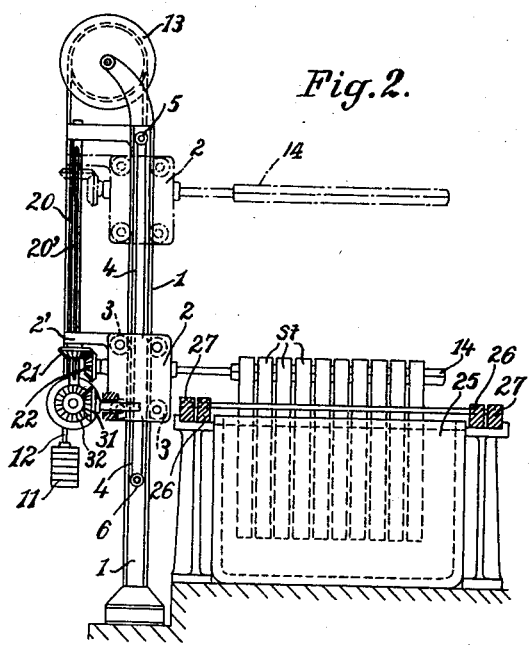
Figure 3:
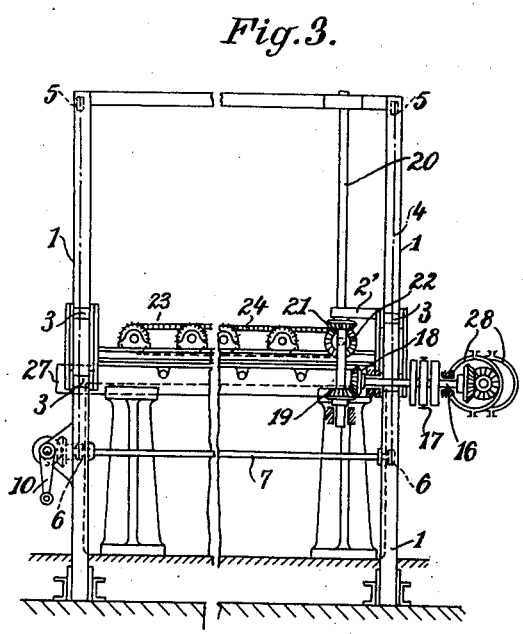
Figure 4:
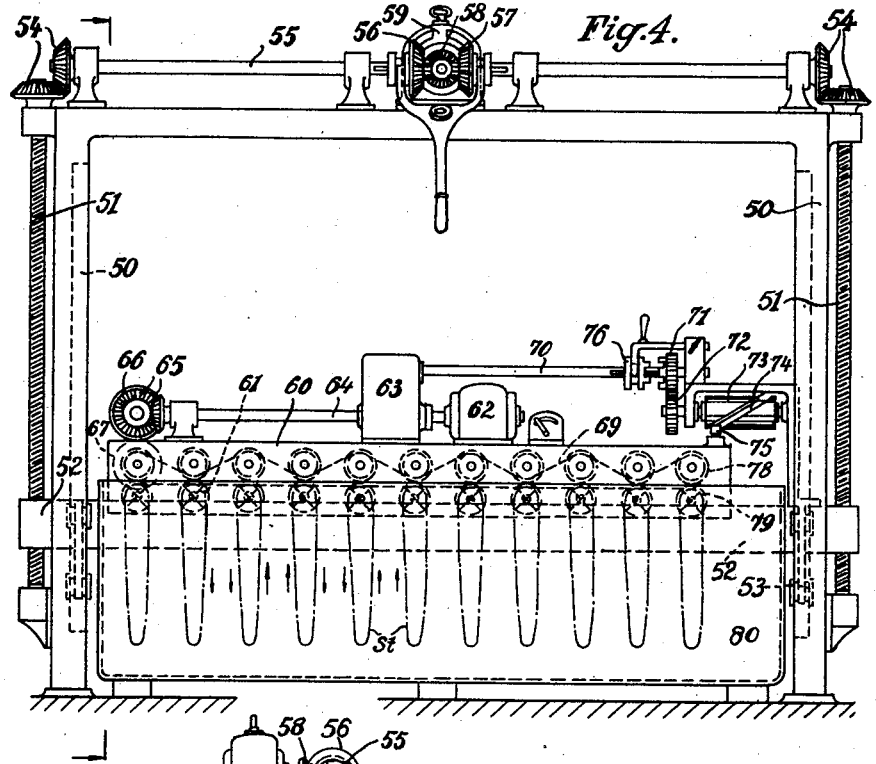
Figure 5:
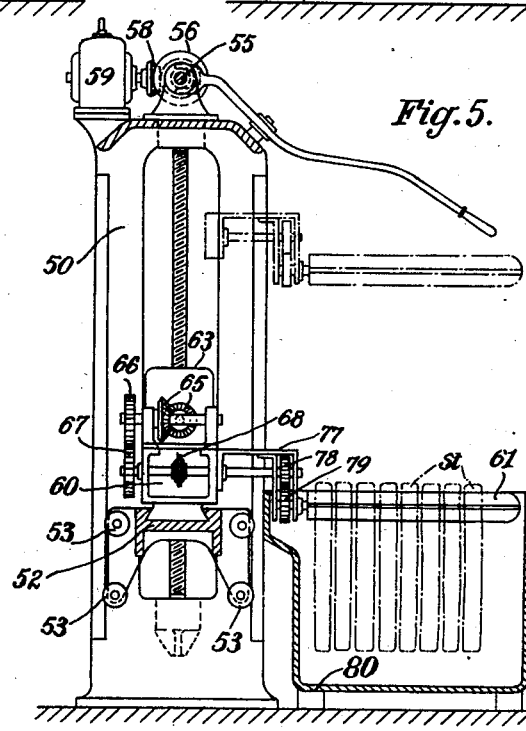

Some preferred constructional forms according to the invention are illustrated by way of example in the accompanying drawings, in which:

Fig. 1 is a plan of a device for the treatment of hanks of yarn according to the invention, Fig. 2 is a front elevation corresponding to Fig. 1, Fig. 3 is a longitudinal side elevation of the said device, wherein for the sake of clarity some details have been omitted, Fig. 4 is an end elevation of a modified constructional form of a device according to the invention, Fig. 5 is an elevation of the latter taken at right angles to Fig. 4, Figs. 6 to 37 show details of various driving means for and various constructional forms of the yarn carrying members for devices according to the invention. Fig. 38 is a sectional plan view on the line XXXVIII—XXXVIII of Fig. 39, of another form of device in accordance with my invention, and Fig. 39 is a sectional view on the line XXXIX—XXXIX of Fig. 38.

Referring to the drawings:

Figs. 1, 2 and 3 show a comparatively simple machine which can be easily mounted as a cheap auxiliary means on the existing dyeing vats without the necessity for special preparatory work such as foundations. For this purpose it is important that in the first place a simple drive is provided for all the yarn carrying members mounted side by side and that the said members can be rotated in every adjusted vertical position. This is advantageous inasmuch as, for example, after lifting the hanks out of the bath the dyeing liquid remains uniformly distributed on the hanks of yarn and undesirable oxidation of the upper parts of the hanks as also over saturation of the lower parts of the hanks is avoided, which in the case of yarn carriers which no longer turn outside of the bath, particularly indanthrene dyeings, would occur. It is consequently no longer necessary to leave the hanks in the bath during the so-called sampling, i. e. the comparative checking of the colour by the aid of dyed samples. In the case of certain after treatment it is also useful if the yarn carriers are adapted to maintain their rotation continuously.

Between two uprights 1 a support 2 is mounted so as to be vertically displaceable through the medium of guide rollers 3 which bear upon the said uprights. The displacement may be effected, for example, by the aid of driving means connected above and below to the support 2, for example, a chain or cable 4, which runs over rollers 5, 6, the rollers 6 being mounted upon an axle 7 which is adapted to be driven by means of pinions 8, 9 and a hand crank 10. Instead of the hand drive a mechanical drive may also be provided. For the purpose of economizing power a balance weight 11 may be provided, which is suspended from cables 12, passing over pulleys 13 to the support 2. It is, of course, also possible to provide in addition to the means serving for vertical displacement, a suitable automatic locking device.

The yarn carrying members 14 are mounted in bearings 15 and are driven from a shaft 16 which is provided with a fast and loose pulley 17 and a corresponding striking gear. The dyeing device or machine shown is suitable both for hand and for mechanical drive. On the shaft 16 a bevel wheel 18 is mounted which drives a bevel wheel 19 provided on the vertical shaft 20. On the shaft 20 which is provided with a longitudinal slot 20' a bevel wheel 21 is mounted so as to be vertically slidable but only rotatable together with the shaft 20. The said wheel is fixed in its position with regard to the support 2 by means of a bearing arm 2' on the one hand and by means of its engagement with a bevel wheel 22 which is mounted on the axle of one of the yarn carrying members 14 on the other hand. On the said axle and also on each of the other yarn carrier axles chain wheels 23 are mounted and all the chain wheels are driven by means of an endless chain 24 from the first chain wheel. If the chain 24 is arranged as illustrated in Fig. 3 then all the yarn carrying members will be turned in one direction. If, however, the chain is led over the the chain wheels alternately above and below then different directions of rotation will be obtained for each of the yarn carrying members located adjacent to one another. As a result of this those parts of each two hanks of yarn hanging side by side which are directed towards one another are moved in the same direction, i. e. a certain number of hank parts which are adjacent at any given time move downwards together and other adjacent hank parts move upwards together. This method of driving is illustrated in one of the further figures of the drawings hereinafter described. As a result of the fact that the bevel wheel 21 can be displaced on the vertical shaft 20 together with the support 2 the continuous drive of the yarn carrying members 14 is possible in all vertical positions attained at any given times. A low position of the yarn carrying members wherein the hanks of yarn St dip into the dye vat 25 is shown in Fig. 2 in full lines. According to requirements the constructional arrangement may, of course, be such that the yarn carrying members turn during the dyeing operation through a path corresponding to one third of their external diameter. In this case only quite a small part of the hanks of yarn will be exposed to the air at any given time so that oxidation, for instance, in the case of indanthrene dyeings cannot occur. The yarn carrying members may be made of any desired shape, i. e. cross section, for example, they may be cruciform. The uppermost position of the yarn carrying members is shown in Fig. 2 in dotted lines.

Above the vat 25 the mechanical means for the swinging or for the swinging and wringing of the hanks of yarn respectively may be arranged. The said means may, for example, comprise pairs of bars 26 and 27 with inserted or attached rods 26' and 27' respectively, which are moved oppositely to one another, for instance, by the aid of suitably adjusted eccentrics 28 and eccentric rods 29. The eccentrics are mounted on a shaft 30 which can be driven through the medium of the bevel wheels 31 and 32, the last named bevel wheel 32 being fixed on the shaft 16.

The drive of the pairs of bars 26, 27 may be effected in various ways and the arrangement of the rods 26' and 27' can be chosen as desired, and in cases where only the swinging of the yarn without any wringing action is to be assisted or effected, a single pair of bars having inserted rods is sufficient, or even only a single bar having rods fixed in it.

The dyeing machine described may also be constructed in such manner that it is transportable in order that it can be moved as desired from one vat to another vat, suitable means being, of course, provided to ensure that, in spite of the movement from one working position to another, the necessary drive of the machine can always be effected. This has to be particularly borne in mind when mechanical drive is provided. For the actual transportation of the device it is also possible to provide a mechanical drive, which must, of course, in certain circumstances be guidable at will.

The yarn carrying members which may in themselves be constructed in any desired suitable manner, are adapted to perform a variety of different movements, a larger or smaller number of modes of movement or operation of the said members being provided according to the extent of the methods of treatment which it is desired to apply by means of the device. The most important modes of movements are possible with the machine or device illustrated in Figs. 4 and 5, namely, (1) the rotation of the yarn carrying members, (2) the raising and lowering of the yarn carrying members and (3) the swinging of the yarn carrying members. The swinging movement consists in this case of a common horizontal to-and-fro motion of all the yarn carrying members. The arrangement may, however, be such that the swinging movement is carried out in a different manner. In all cases it is important that the rotary movement and also the swinging movement should be capable of being continued uninterruptedly in all high or low positions of the yarn carrying members, and in particular also during the displacement of the same from one position to another.

The dyeing machine or device according to Figs. 4 and 5 comprises lateral uprights 50 in which by the aid of screw spindles 51 a horizontal supporting bar 52 is arranged so as to be vertically displaceable, which bar is guided by means of rollers 53 on the uprights 50. The drive of the screw spindles 51 is effected by the aid of pairs of bevel wheels 54 from a shaft 55. The shaft 55 is provided with two bevel wheels 56 and 57 with which the driving wheel 58 can be brought alternatively into engagement. The wheel 58 is mounted on a shaft driven from a suitable point. It is preferable to connect the wheel 58 direct to an electro-motor 59 in such manner that the change-over gear formed by the wheels 56, 57 and 58 can be employed in different ways in order to turn the screw spindles 51 in the one or in the other direction just according to whether the horizontal supporting bar 52 which carries the rotatable yarn carrying members, is to be moved upwards or downwards. When the wheel 58 is located in the middle between the wheels 56 and 57 the horizontal supporting bar 52 is stationary. A gear box 60 which is common to all the yarn carrying members and in which all the yarn carrying members 61 are mounted is arranged on the horizontal supporting bar so as to be longitudinally displaceable by means of a guide. For the purpose of obtaining independent drive of the yarn carrying members 61 for the turning movement around their longitudinal axes an electro-motor 62 having a speed reducing gear 63 connected to it may be provided on the gear box 60. From the electro-motor one of the shafts of the yarn carrying members is driven by means of a shaft, a pair of bevel wheels 65 and spur wheels 66 and 67. All the shafts of the yarn carrying members are provided with chain wheels 68 and over the latter an endless chain 69 is led so that all the yarn carrying members are set in rotation. The chain may, for instance, be arranged in the manner shown in Fig. 4, whereby in each case the adjacent yarn carrying members have directions of motion which are opposite to one another in such manner that the parts of the hanks of yarn adjacent to one another at any given time move alternately in common in one direction into or out of the bath, as is indicated by arrows in Fig. 4. With the driving device for rotating the yarn carrying members the driving device for the to-and-fro swinging movement of the yarn carrying members in common can be combined, this being, of course, effected in such manner that the swinging movement can be stopped by means of the driving gear as may be desired or may be necessary. The swinging of the yarn carrying members can be effected by means of a shaft 70 connected to the speed reducing gear 63, from which shaft by the aid of a pair of spur wheels 71, 72 a cam roller 73 having an inclined groove 74 is driven, the gear box 60 of the yarn carrying members engaging by means of a roller 75 with the inclined groove 74. When the cam roller 73 is driven a horizontal to-and-fro movement transversely to the shafts of the yarn carrying members is imparted to the gear box and to the yarn carrying members respectively. The pair of spur wheels 71, 72 must, of course, be so arranged that in spite of the displacement of the gear box the drive of the cam roller 73 is ensured. A coupling sleeve 76 slidable on the shaft 70 but rotatable with the latter serves the purpose of switching the drive of the cam roller 73 in or out at any given time. In Fig. 4 the drive is illustrated in the position in which it is switched out.

The journalling and driving arrangements for the yarn carrying members are constructed in such manner that the hanks of yarn can, if desired, be entirely or nearly entirely immersed below the surface of the bath in such manner that the hanks in their rotary course are exposed either not at all or only to a very slight extent in a transitory manner to the air and consequently oxidation or bronzing cannot occur. This arrangement is valuable for dyeing with indanthrene and sulphur colours. As can be seen from Fig. 5 separate journal brackets 77 on the gear box 60 for each yarn carrying member are provided for the pair of toothed wheels 78, 79 and the shafts of the yarn carrying members proper. Fig. 5 shows by way of example, a low position of the rotating yarn carrying members in the dye bath. The dyeing vat 80 is illustrated in section in this figure. The highest position attainable by raising the yarn carriers out of the bath is indicated in Figure 5 in dotted lines. The hanks of yarn are denoted by St.

By means of this dyeing machine or device the following working conditions are inter alia attainable:

a. Such low positions of the yarn carrying members that the hanks are entirely immersed in the bath; either rotary movement only or to-and-fro swinging movement only or rotary movement and to-and-fro swinging movement of the yarn carrying members together with the hanks being carried out in these positions.

b. Such high positions of the yarn carrying members that the hanks are only immersed in the bath over a part of their length which can be adjusted to a smaller or larger value; either only rotary movement or only to-and-fro swinging movement or rotary and to-and-fro swinging movement of the yarn carrying members together with the hanks being carried out in these positions.

c. Such high positions of the yarn carrying members that the hanks are no longer immersed in the bath at all but are suspended in the open air; either rotary movement only, or to-and-fro swinging movement only or rotary movement and to-and-fro swinging movement of the yarn carrying members together with the hanks being carried out in these positions.

d. Up and down movement of the yarn carrying members between any desired high and low limiting positions; either rotary movement only or to-and-fro swinging movement only or rotary movement and to-and-fro swinging movement of the yarn carrying members together with the hanks being carried out during the said up and down movement.

e. Variations of the nature of the rotary and swinging movements during the upward path as compared with the downward path of the yarn carrying members together with the hanks, or cessation of such movements.

f. Stationary location of the yarn carrying members in any desired high or low position; the rotary and swinging movements of the yarn carrying members being continued or stopped in the meantime as required.

g. The raising and lowering movement of the yarn carrying members may be effected at variable speed, for example, in such manner that the hanks are lowered into the bath slowly and are raised out of it again more rapidly.

Instead of the means for producing the movements employed in the constructional example according to Figs. 4 and 5, other means also may be used.

Thus the raising movement of the supporting bar 52 serving for the reception of the rotatable yarn carrying members in common can be effected by having the bar fixed to two endless chains passing over wheels.

Furthermore, the employment of chains in the manner shown in Fig. 6 is possible. In this case the chains 82 led over wheels 81 are connected on the one hand to the bar 52 and on the other hand to cam discs 83 which are rotated simultaneously in opposite directions in any desired manner.

The arrangement may also be such that the gear box 60 as shown in Fig. 7 rests directly on pins or rollers 84 provided on cam discs 83, which receive their drive through the medium of worm wheels 85 and worms 86. The worms 86 are fixed on shafts 87, on which bevel wheels 100 are mounted in such manner that they turn with the shaft but are slidable thereon so that by the aid of a manipulating lever 101 they can be brought alternatively into engagement with a bevel wheel 102 provided on a driving shaft 103. When, at any given time, the position of the manipulating lever 101, which is fulcrumed at 104, is changed over, the direction of the longitudinal movement of the gear box 60 changes. During the longitudinal movement of the gear box, the latter simultaneously moves up and down. In this case, independently of the raising and of the lowering of the yarn carrying members any desired to-and-fro swinging movement of the gear box 60 may be effected, this being particularly facilitated by the aid of the rollers 84.

A similar construction is illustrated in Fig. 8. In this case, the box 60 together with the yarn carrying members positively executes a rotary movement in a vertical plane.

In all the raising devices it is preferable to balance approximately the total weight to be raised, by means of counter-weights.

For the production of the swinging movements which may be carried out horizontally or vertically to the shafts of the yarn carrying members, transversely, longitudinally, in a circular or curved path or the like, various drives are possible, for example, the drive may be effected by means of crank pins or eccentrics driven in any suitable known manner and adapted to co-operate with guide members provided on the gear box 60 or adapted to drive the latter through the medium of connecting rods.

The box 60 holding the yarn carrying members is mounted in suitable manner according to the movements to be obtained, so that for the production of the movements only small forces are necessary.

For example, the box 60 may, as shown in Fig. 9, be mounted by the aid of rollers 88 and rollers 89 located transversely to the latter, in such manner that a horizontal circular swinging movement of the box 60 is possible without hindrance. Similar driving means to those last specified can be employed in this case also, two sets of driving members, one operating upon the gear box to move it in the longitudinal direction and the other operating upon the gear box to move it in the transverse horizontal direction being employed to provide the two components of the horizontal circular movement. It will be clear that the arrangement of the rollers 88 and 89 enables the gear box to move freely in the longitudinal and the transverse horizontal direction respectively so that a circular movement made up of two components in the aforesaid directions is possible. The bearing is maintained in all high and low positions of the box, the rollers 89 being moved upwards and downwards with the box. This construction is further illustrated in Figs. 38 and 39, Fig. 38 being a plan view wherein individual parts are shown in horizontal section taken on line XXXVIII—XXXVIII of Fig. 39 and Fig. 39 is a section taken on line XXXIX—XXXIX of Fig. 38. In the construction as shown on the drawings the gear box is provided at its ends with rollers 88 whilst the bar 252 which is vertically displaceable is provided at a suitable distance apart with supporting rollers 89 located transversely to the gear box 60. For the production of a horizontal circular swinging movement of the gear box 60 crank discs 253 are provided the crank pins 254 of which project into extensions 255 extending from the gear box 60. The crank discs 253 are mounted on the bar 252 by means of vertical shafts and may be constructed at the same time as worm wheels with which worms 256 engage, the latter being fixed on the shaft 257 which is adapted to be driven by means of an electromotor 258. The reference numeral 259 denotes a stirrup fixed on the bar 252, which stirrup protects the gear box 60 subjected to the load of the yarn carriers 61 and the hanks suspended therefrom against lateral tipping movement.

In place of the roller bearings ball bearings may also be employed.

The mechanisms for the production of the raising, swinging and rotating movements should always be constructed in such manner that either only a partial immersion of the hanks in the bath or an entire immersion below the bath can be effected.

The drive for the rotation of the yarn carrying members may, inter alia, be effected, as illustrated in plan in Fig. 10, at variable speed and invariable directions. In this case, a toothed segment 90 provided with an adjustable stop is employed, which segment is oscillated by means of a crank 91 and connecting rod 92. With the segment 90 a gear 93 engages, and the shafts of the yarn carrying members 61 are driven by means of a pair of bevel wheels 94, 95, the yarn carrying members being operatively connected with one another in any desired manner.

Besides the methods of effecting the movements and the drive indicated in the description and drawings by way of example only and the individual constructional forms which are likewise illustrated only by way of example, numerous modifications thereof within the scope of the invention are also possible, such modifications being very extensive in view of the numerous technical accessories which are at disposal.

By means of the invention it is also possible to obtain a certain swinging movement of the hanks of yarn by alteration of the cross section of the yarn carrying members, and this fact provides the advantage that the alteration of the cross section can be effected in each case in suitable manner for the various methods of dyeing.

It is preferable to employ yarn carrying members having a substantially star-shaped (in the simplest construction cruciform) cross section which can, for instance, be attained by fixing a number of longitudinal bars or strips to the shaft of the yarn carrying member. The outer edges of the longitudinal strips which are preferably rounded off are not connected with one another by means of separate peripheral strips or the like.

The possibility of altering or varying the cross section of the yarn carrying members is useful in many different dyeing processes. For example a cross section of a yarn carrying member which is broadened on one side is suitable for the unidyeing process, whilst for ombré and multiple dyeing the ordinary centric form of cross section is necessary. With the eccentric cross section a certain to and fro swinging movement of the hanks suspended from the yarn carrying members in the bath is obtained, and the extent of the swinging movement can be increased or diminished in any particular case by corresponding alteration of the eccentricity. In general, i. e. in the case of yarn carrying members mounted side by side in such manner as not to be displaceable, there are certain limits for the eccentricity of the cross section. The arrangement may, however, also be such that the axial distance of the yarn carrying members from one another is variable so that the variation of the eccentricity is possible within wider limits.

In certain cases, for example in the case of long hanks and low vats, it is advantageous, according to the nature of the material to be dyed and the method of dyeing, if the arrangement is such that the cross section of the yarn carrying members may be concentrically increased as well as eccentrically broadened. Suitable different constructional forms can be found to meet all cases arising in practice.

The possibility of alteration or variation of the cross section of the yarn carrying members according to the invention is preferably obtained by providing each yarn carrying member with at least one displaceable, detachable or interchangeable carrying part.

The practical realization of this inventive feature can, of course, be attained in various ways and, in this connection, a further feature of the invention consists in arranging that, for example a carrying part may be brought out of its ordinary position from the one side of the shaft of the yarn carrying members to the opposite side, or that a detachable auxiliary bar is employed which for the purpose of one sided broadening of the cross section is set on one of the longitudinal bars of the star-shaped yarn carrying member. If desired a plurality of such auxiliary bars may be provided for the individual yarn carrying members. A constructional example of a yarn carrying member having detachable auxiliary bars is illustrated in Figs. 11 and 11a. Fig. 11 shows a yarn carrying member together with an auxiliary bar in cross section and Fig. 11a shows a plan of the two parts taken from above.

In the example shown the yarn carrying member 2 mounted on the rotating shaft 1 is cruciform. On one of the four longitudinal strips of the yarn carrying member a detachable auxiliary bar 2' is mounted in such manner that the total cross section of the yarn carrying member is broadened in the corresponding direction. The auxiliary bar may be attached in any suitable manner, for example by the aid of clamps or the like.

For the construction of the yarn carrying member and the auxiliary bars it is preferable to employ a material which is not oxidized by the dye bath when in use—for example rustless steel may be employed.

A large number of other constructional forms of the yarn carrying members may be employed as is illustrated in Figs. 12 to 37.

Fig. 12 shows in cross section several concentric yarn carrying members arranged side by side, which are all of the same cruciform cross section. Each yarn carrying member consists of two parts 2 and 4 respectively which are arranged so as to be displaceable with regard to one another, the part 4 being arranged so as to be slidable. The part 4 is provided with holes 4' which serve to enable it to be fastened by means of screws 40 or the like to the parts 2, 2. In place of the holes 4' slots 41 (Figs. 15 and 16) may be provided. Fig. 13 shows the concentric yarn carrying members illustrated in Fig. 12 after conversion into one of eccentric cross section.

Fig. 14 shows in plan one of the yarn carrying members illustrated in Fig. 12. Fig. 15 shows in cross section a cruciform yarn carrying member of somewhat different constructional form, and Fig. 16 is a plan corresponding thereto. Figs. 17, 18 and 19 show a further modified constructional form in cross sections and in plan respectively. In this constructional form the interchangeable part 4 is provided with pins 42, which are adapted to be introduced into corresponding holes 20 in the part 2 from either side as shown in Figs. 17 and 18 respectively. After the introduction of the pins 42 into the holes, the part 4 is clamped in position by means of clamping screws. Fig. 20 shows in cross section a cruciform yarn carrying member having a carrying part 4 provided with inclined slots which is slidable within the slot 3 in the middle of the member 1 extending over the whole length of the yarn carrying member. For the purpose of displacing the carrying part 4 a bar 5 is provided which engages through the medium of pins 6 in the inclined slots 7 of the said part 4. The bar 5 is guided in a groove of the core member 1 and at suitable places brackets 8 are provided which guide the bar from the exterior. In the construction according to Figs. 20, 21 and 22 the carrying part 4 is located in the central position and in Fig. 23 it is shown laterally displaced. The yarn carrying member according to Fig. 24 is constructed in similar manner to that shown in Figs. 20–23. In this case the carrying part 2 is connected to the tubular member 9 and the part 4 is guided in suitable slots of the tubular member. In the tubular member 9 an adjusting bar 10 is mounted which is provided with pins 11 projecting into corresponding inclined slots of the part 4. In the further modified constructional form shown in Figs. 25 to 27 a quadrilateral core member 12 is provided. At two sides of the latter carrying parts 13 and 14 are fixed, which are provided with longitudinal slots through which displaceable parts 15 and 16 project. For the purpose of displacing the carrying parts bars 17 and 18 are provided which are mounted on the carrying part 14 by means of a bracket 19. On the said bars pins 17' and 18' respectively are provided which engage inclined slots 20 of the carrying parts. The concentric position of the carrying parts is shown in Figs. 25 and 26 and the eccentric position thereof in Fig. 27.

Figure 28:
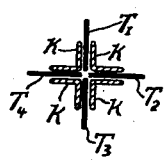
Figure 29:
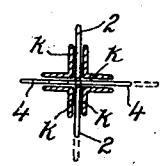
Figure 30:
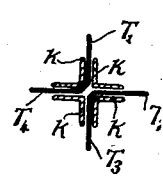
Figure 31:
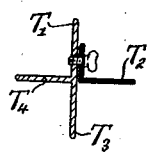
Figure 32:
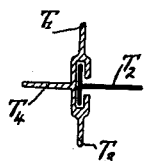
Figure 33:
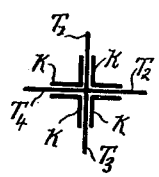
Figure 34:
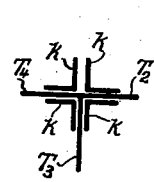

In the constructional form shown in Fig. 28 four individual inserted carrying parts T¹—T⁴ are provided which can be detached either singly or all together, just according to whether it is desired to obtain a certain definite concentric or eccentric cross section. The parts K constitute the guide members rigidly fixed to the rotating shaft. Fig. 29 shows a similar constructional form, which is however provided with carrying parts 2, 2 and 4, 4 respectively which extend through one another and are inserted one within the other. Fig. 30 shows a construction in which angle pieces are inserted in the yarn carrying member. In Fig. 31 a detachable carrying part for a yarn carrying member which is normally of T-section is shown. Fig. 32 shows a carrying part T² slidable in a T-shaped member. In the constructional form according to Fig. 33 four carrying parts are provided which may be inserted as a whole in the core member K of the yarn carrying member. In the constructional form according to Fig. 34 a T-shaped insertion piece is employed. In the core members K illustrated in Figs. 28, 29, 30, 33 and 34 a large variety of different shapes of carrying parts may be inserted as can be seen from the drawings.

Figure 35:
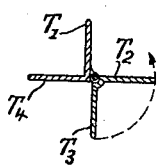
Figure 36:
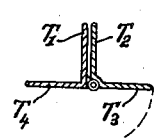
Figure 37:
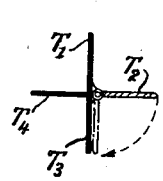

In the constructional form according to Figs. 35 and 36 an angular carrying part is provided which is capable of being flapped over so that alternatively a cruciform or a T-shaped cross section may be obtained. Fig. 37 shows a yarn carrying member having a single part capable of being flapped over, in which case also the conversion of a cruciform into a T-shaped cross section and vice versa is rendered possible.

In all the constructional forms of the yarn carrying members according to the invention it is preferable to take care that the displacement of the carrying part or carrying parts respectively takes place without any alteration of position in the longitudinal direction of the yarn carrier. For this purpose suitable guide parts may be provided.

We claim:

1. A device for the treatment of hanks of yarn including a bath, a supporting bar extending longitudinally of the bath, a second support mounted on the supporting bar and arranged to be moved longitudinally and transversely thereof, yarn carrying members journaled in the second support extending over the bath, means for raising and lowering the supporting bar, means on the second support for rotating the yarn carriers at any position of the supporting bar, and means carried by the supporting bar and the second support for moving the second support longitudinally and transversely relative to the supporting bar.

2. A device for the treatment of hanks of yarn including a bath, a supporting bar extending longitudinally of the bath, transverse rollers on the supporting bar, a second support having longitudinally extending rollers resting on the rollers on the supporting bar, whereby the second support can be moved longitudinally and transversely relative to the supporting bar, yarn carrying members journaled in the second support extending over the bath, means for raising and lowering the supporting bar, means on the second support for rotating the yarn carriers at any position of the supporting bar, and means carried by the supporting bar and the second support for moving the second support longitudinally and transversely relative to the supporting bar.

FRIEDRICH FAIGLE.
CARL FAIGLE.